US010830092B2

(12) United States Patent
Snow et al.

(10) Patent No.: US 10,830,092 B2
(45) Date of Patent: Nov. 10, 2020

(54) BEARING ROTOR THRUST CONTROL

(71) Applicant: General Electric Company, Schenectady, NY (US)

(72) Inventors: Kyle Robert Snow, Loveland, OH (US); Andrew Michael Tompkins, Cincinnati, OH (US); Andrew Michael Watson, Cincinnati, OH (US); Philip Joseph Ogston, Cincinnati, OH (US); Christopher Michael Thompson, West Chester, OH (US)

(73) Assignee: General Electric Company, Schenectady, NY (US)

( * ) Notice: Subject to any disclaimer, the term of this patent is extended or adjusted under 35 U.S.C. 154(b) by 242 days.

(21) Appl. No.: 15/914,419

(22) Filed: Mar. 7, 2018

(65) Prior Publication Data
US 2019/0277157 A1    Sep. 12, 2019

(51) Int. Cl.
*F01D 3/04*    (2006.01)
*F01D 21/14*    (2006.01)
(Continued)

(52) U.S. Cl.
CPC ............... *F01D 21/14* (2013.01); *F01D 3/04* (2013.01); *F01D 21/003* (2013.01); *F01D 25/16* (2013.01); *F16C 19/10* (2013.01); *F16C 19/522* (2013.01); *F16C 19/527* (2013.01); *G01H 9/004* (2013.01); *G01L 5/0019* (2013.01); *G01L 19/12* (2013.01);
(Continued)

(58) Field of Classification Search
None
See application file for complete search history.

(56) References Cited

U.S. PATENT DOCUMENTS

| 5,221,146 A | 6/1993 | Maruyama |
| 5,311,734 A | 5/1994 | Pope et al. |

(Continued)

FOREIGN PATENT DOCUMENTS

| EP | 3015659 A1 | 5/2016 |
| WO | WO2011/153496 A1 | 12/2011 |

OTHER PUBLICATIONS

Larsen, et al., Sensing Challenges for Mechanical Aerospace Prognostic Health Monitoring, Etegent Technologies, 5 pages.

(Continued)

*Primary Examiner* — Kayla Mccaffrey
(74) *Attorney, Agent, or Firm* — Dority & Manning, P.A.

(57) ABSTRACT

Rotor thrust balancing systems for turbomachines and methods of using the same are generally disclosed. For example, a rotor thrust balancing system for a turbomachine, wherein the turbomachine defines a centerline extending the length of the turbomachine. The system includes a rotating drive shaft, a thrust bearing, and a first waveguide sensor. The rotating drive shaft couples a turbine section and a compressor section of the turbomachine. The thrust bearing supports the rotating drive shaft of the turbomachine. The thrust bearing includes a plurality of ball bearings, an inner race coupled to the rotating drive shaft, and an outer race coupled to a fixed structure. The first waveguide sensor is coupled to the outer race at a first end of the waveguide sensor. The waveguide sensor communicates a vibrational frequency from the thrust bearing to a second end of the waveguide sensor.

20 Claims, 10 Drawing Sheets

(51) Int. Cl.
*F01D 21/00* (2006.01)
*F01D 25/16* (2006.01)
*F16C 19/10* (2006.01)
*G01H 9/00* (2006.01)
*G01L 5/00* (2006.01)
*F16C 19/52* (2006.01)
*G01L 19/12* (2006.01)
*F02C 7/06* (2006.01)
*F16C 19/02* (2006.01)
*F16C 19/16* (2006.01)

(52) U.S. Cl.
CPC .......... *F02C 7/06* (2013.01); *F05D 2220/323* (2013.01); *F05D 2240/52* (2013.01); *F05D 2260/15* (2013.01); *F05D 2270/334* (2013.01); *F05D 2270/54* (2013.01); *F16C 19/02* (2013.01); *F16C 19/163* (2013.01); *F16C 2233/00* (2013.01); *F16C 2326/43* (2013.01); *F16C 2360/23* (2013.01)

(56) References Cited

U.S. PATENT DOCUMENTS

| | | | |
|---|---|---|---|
| 5,760,289 A | 6/1998 | Skottegard | |
| 6,141,087 A | 10/2000 | Viel | |
| 8,314,925 B2 * | 11/2012 | Rubbiero | G01L 5/0009 356/32 |
| 8,434,994 B2 | 5/2013 | Pal et al. | |
| 8,568,084 B2 | 10/2013 | Zheng et al. | |
| 9,303,523 B2 | 4/2016 | Rodriguez et al. | |
| 9,447,817 B2 * | 9/2016 | Gallimore | F01D 25/16 |
| 9,482,595 B2 | 11/2016 | White et al. | |
| 9,664,593 B2 * | 5/2017 | Gallimore | F01D 21/003 |
| 2007/0122265 A1 | 5/2007 | Ansari et al. | |
| 2016/0273973 A1 | 9/2016 | Larsen et al. | |
| 2016/0294033 A1 * | 10/2016 | Larsen | H01P 3/04 |
| 2017/0274992 A1 | 9/2017 | Chretien | |

OTHER PUBLICATIONS

Larsen, et al., Broadband Waveguide Sensors for Use in High-Temperature, Corrosive, and Other Harsh or Difficult-to-Access Environments, Etegent Technologies, 8 pages.

Larsen, et al., Waveguide Vibrations Sensors for Aerospace Health Monitoring, Etegent Technologies, 20 pages.

European Search Report Corresponding to Application No. 18214621 2 dated Jul. 22, 2019.

* cited by examiner

BEARING ROTOR THRUST CONTROL

FEDERALLY SPONSORED RESEARCH

This invention was made with government support under contract number FA8650-15-D-2501 of the Department of the Air Force. The government may have certain rights in the invention.

FIELD

The present subject matter relates generally to turbomachinery and, more particularly, to a balanced thrust bearing system in a turbomachine.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Conventional gas turbine engines include rotor assemblies having shafts, compressor impellers, turbines, couplings, sealing packs, and other elements for optimal operation under given operating conditions. These rotor assemblies have a mass generating a constant static force due to gravity, and also generate a dynamic force due, e.g., to imbalances in the rotor assembly during operation, accelerations, etc. In addition to radial shaft forces, the rotating assembly also experiences axial forces generated from, e.g., internal pressures between the turbomachinery stages and the thrust of the gas turbine engine. Such gas turbine engines include radial bearings and thrust bearings to sustain and support these forces while permitting rotation of the rotor assembly. For example, the sum of the axial forces may result in a net axial force or thrust. Such thrust may be in the forward or aft direction. The thrust bearing may be employed to absorb this thrust and allow the rotor assembly to continue rotation.

In certain situations, the net axial force or thrust acting on the thrust bearing may switch direction from forward to aft or vice-versa; such a situation is referred to as cross-over. As such, if not compensated for, cross-over may lead to unloaded ball bearings in the thrust bearing. Unloaded ball bearings may reduce radial centering of the rotor, resulting in altered seal clearances. Low rotor thrust on the bearings can also cause the ball bearings to slip relative to the raceways and potentially cause skidding damage. Also, low rotor thrust may reduce the effective bearing stiffness, possibly having an adverse impact on rotordynamics.

To prevent cross-over conditions, some rotor assemblies are designed such that the resultant thrust remains unidirectional, either forward or aft, under a wide range of operating conditions. Such designs may lead to oversized and overweight bearings to compensate for unidirectional turbine assemblies. For instance, the thrust bearing must be capable of supporting the thrust loads while being limited to only receiving forward or aft net force.

Therefore, a lighter, smaller thrust bearing in a system capable of correcting for thrust cross-over would be useful. More specifically, a rotor thrust system capable of utilizing both the forward and aft capabilities of a thrust bearing while having reduced size and weight would be particularly beneficial.

BRIEF DESCRIPTION

Aspects and advantages will be set forth in part in the following description, or may be obvious from the description, or may be learned through practice of the invention.

In one aspect, the present disclosure is directed to a rotor thrust balancing system for a turbomachine, wherein the turbomachine defines a centerline extending the length of the turbomachine. The system includes a rotating drive shaft, a thrust bearing, and a first waveguide sensor. The rotating drive shaft couples a turbine section and a compressor section of the turbomachine. The thrust bearing supports the rotating drive shaft of the turbomachine. The thrust bearing includes a plurality of ball bearings, an inner race coupled to the rotating drive shaft, and an outer race coupled to a fixed structure. The first waveguide sensor is coupled to the outer race at a first end of the waveguide sensor. The waveguide sensor communicates a vibrational frequency from the thrust bearing to a second end of the waveguide sensor.

In one embodiment, the system further includes a second waveguide sensor. The first end of the first waveguide sensor may be coupled to a forward end of the outer race relative to the centerline. A first end of the second waveguide sensor may be coupled to the aft end of the outer race relative to the centerline. In another embodiment, the system further includes a thrust cavity in contract with the rotating drive shaft. The thrust cavity may be pressurized to modify a force on the rotating drive shaft either forward or aft relative to the centerline. In a different embodiment, the thrust cavity is located at the turbine section of the turbomachine. In a still further embodiment, the thrust cavity is located at the compressor section of the turbomachine.

In a further embodiment, the first waveguide sensor includes a second end located outside the turbomachine. In another embodiment, the system further includes a control sensor located at the second end of the first waveguide sensor. The control sensor may communicate the vibrational frequency of the thrust bearing to a control system of the turbomachine. In one exemplary embodiment, the control system is communicates with a valve to reduce or increase pressure supplied to a thrust cavity. As such, the thrust cavity may modify a force either forward or aft on the rotating drive shaft relative to the centerline. In another embodiment, the control sensor is a piezoelectric sensor. In a further embodiment, the control system is a full authority engine control system.

In one exemplary embodiment, the rotating drive shaft is a high pressure drive shaft coupling a high pressure turbine section to a high pressure compressor section. In a still further embodiment, the rotating drive shaft is a low pressure drive shaft coupling a low pressure turbine section to at least one of a low pressure compressor section or a fan section.

In another aspect, the present disclosure is directed toward a method of balancing rotor thrust on a thrust bearing of a turbomachine. Wherein, the turbomachine defines a centerline extending the length of the turbomachine. The method includes communicating a vibrational frequency from the thrust bearing to the exterior of the turbomachine using a waveguide sensor coupled to the thrust bearing. In another step, the method includes communicating the vibrational frequency to a control sensor communicatively coupled to a control system. In a different step, the method includes determining whether the thrust bearing is in a cross-over condition. In a still further step, the method includes changing a force on a rotating drive shaft to remove the thrust bearing out of the cross-over condition.

In one embodiment, the vibrational frequency includes a ball passing frequency. In a further embodiment, the method includes determining if the ball passing frequency of the thrust bearing is below a first threshold. In an exemplary embodiment, the method further includes changing the pressure of a thrust cavity in contact with the rotating drive shaft in response to a cross-over condition of the thrust bearing. In a still further embodiment, the method includes communicating a signal from the control system to a valve. The valve may be coupled to and receive a pressurized fluid from a compressor section of the turbomachine and selectively transfers the pressurized fluid to a thrust cavity in contact with the rotating drive shaft. In one embodiment, the method further includes changing the pressure of the thrust cavity. As such, the changing pressure of the thrust cavity may modify a force applied to the rotating drive shaft.

In another aspect, the present invention is directed towards a method of determining the direction of rotor thrust on a thrust bearing of a turbomachine, wherein the turbomachine defines a centerline extending the length of the turbomachine. The method includes communicating a ball passing frequency from the thrust bearing to the exterior of the turbomachine using a first waveguide sensor and a second waveguide sensor coupled to the thrust bearing. The method also includes communicating the ball passing frequency to control sensors communicatively coupled to a control system. In a further step, the method includes comparing the magnitude of a first ball passing frequency communicated from the first waveguide sensor at a forward end of the thrust bearing relative to the centerline to a second ball passing frequency communicated from the second waveguide sensor at an aft end of the thrust bearing relative to the centerline.

In an exemplary embodiment, the method further includes determining the direction of the rotor thrust acting on the rotating drive shaft relative to the centerline based on the difference between the magnitude of first ball passing frequency and the second ball passing frequency.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
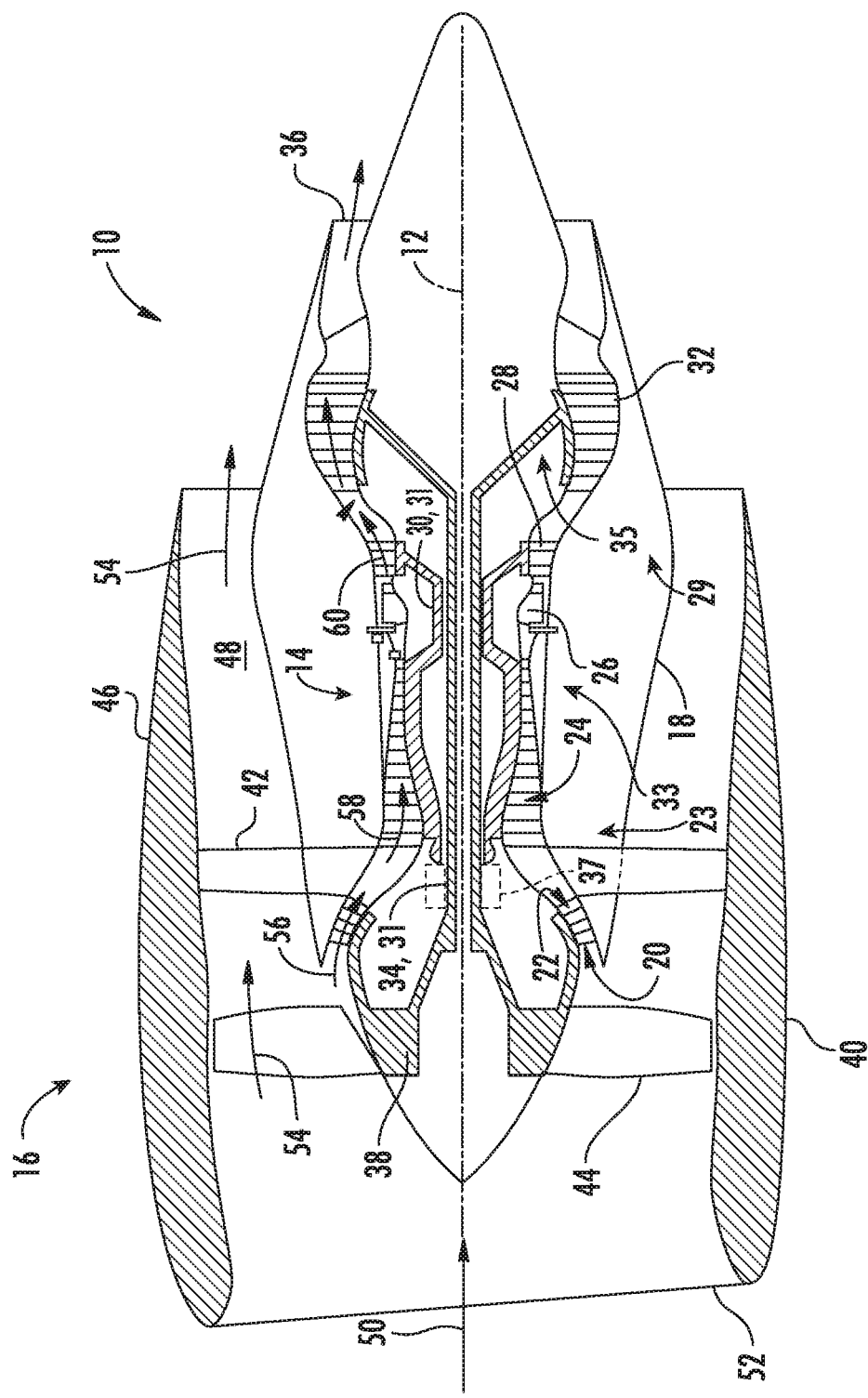
FIG. 1 is a cross-sectional view of one embodiment of a gas turbine engine that may be utilized within an aircraft in accordance with aspects of the present subject matter.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A system is generally provided for balancing rotor thrust for a turbomachine, along with methods of doing the same. In one embodiment, the system includes a rotating drive shaft, a thrust bearing, and a first waveguide sensor. The rotating drive shaft generally couples a turbine section of the turbomachine and a compressor section of the turbomachine. In one embodiment, the thrust bearing includes a plurality of ball bearings, an inner race, and an outer race, such that the inner race is coupled to the rotating drive shaft and the outer race is coupled to a fixed structure. According to one particular embodiment, the first waveguide sensor is coupled to the outer race at a first end of the waveguide sensor. Generally, the waveguide sensor may communicate a vibrational frequency from the thrust bearing to a second end of the waveguide sensor.

In certain embodiments, the rotor thrust balancing system for a turbomachine prevents the thrust bearing from operating in a cross-over condition. Avoidance of the cross-over condition may reduce the occurrence of unloaded ball bearings in the thrust bearing. For example, prevention of cross-over may allow for better radial centering of the rotor and proper seal clearances. Avoiding slippage on the ball bearings relative to the raceways may prevent skidding damage. Further, preventing low rotor thrust may help to insure the correct effective bearing stiffness and avert an adverse impact on rotor dynamics.

In certain embodiments, the ability to measure rotor thrust cross-over and correct for it would allow a product engine to have a larger range of rotor thrust, without increasing the overall magnitude of rotor thrust in any one direction. Additionally, a lower magnitude of bearing thrust load allows for a smaller, lighter weight bearing. For example, bearing size may be minimized by centering the rotor thrust near zero, or a null position, while still avoiding the cross-over condition, allowing for smaller magnitudes of thrust load. Further, replacing measurement technology such as accelerometers with waveguide sensors may allow for the sensor to be attached at the bearing, where accelerometers may not have enough reliability. For example, the part with the lowest reliability of a waveguide sensor, e.g. the piezoelectric sensor, may be mounted exterior of the engine where it is subjected to less heat and is more easily replaceable.

It should be appreciated that, although the present subject matter will generally be described herein with reference to a gas turbine engine, the disclosed systems and methods may generally be used on thrust bearings within any suitable type of turbine engine, including aircraft-based turbine engines, land-based turbine engines, and/or steam turbine engines. Further, though the present subject matter is generally described in reference to a high pressure spool of a turbine engine, it should also be appreciated that the disclosed system and method can be used on any spool within a turbine engine, e.g. a low pressure spool or an intermediate pressure spool.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a compressor section 23. For the embodiment show, the compressor section 23 includes a booster compressor 22 and a high pressure compressor 24. The booster compressor 22 generally increases the pressure of the air (indicated by arrow 54) that enters the core engine 14 to a first pressure level. The high pressure compressor 24, such as a multi-stage, axial-flow compressor, may then receive the pressurized air (indicated by arrow 58) from the booster compressor 22 and further increase the pressure of such air. The pressurized air exiting the high pressure compressor 24 may then flow to a combustor 26 within which fuel is injected into the flow of pressurized air, with the resulting mixture being combusted within the combustor 26.

For the embodiment illustrated, the outer casing 18 may further enclose and support a turbine section 29. Further, for the depicted embodiment, the turbine section 29 includes a first high pressure turbine 28 and second low pressure turbine 32. For the illustrated embodiment, high energy combustion products 60 are directed from the combustor 26 along the hot gas path of the engine 10 to the high pressure turbine 28 for driving the high pressure compressor 24 via a first, high pressure drive shaft 30. Subsequently, the combustion products 60 may be directed to the low pressure turbine 32 for driving the booster compressor 22 and fan section 16 via a second, low pressure drive shaft 34 generally coaxial with first drive shaft 30. After driving each of turbines 28 and 32, the combustion products 60 may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 surrounded by an annular fan casing 40. It should be appreciated by those of ordinary skill in the art that the fan casing 40 may be supported relative to the core engine 14 by a plurality of substantially radially-extending, circumferentially-spaced outlet guide vanes 42. As such, the fan casing 40 may enclose the fan rotor assembly 38 and its corresponding fan blades 44. Moreover, a downstream section 46 of the fan casing 40 may extend over an outer portion of the core engine 14 so as to define a secondary, or by-pass, airflow conduit 48 providing additional propulsive jet thrust.

It should be appreciated that, in several embodiments, the low pressure drive shaft 34 may be directly coupled to the fan rotor assembly 38 to provide a direct-drive configuration. Alternatively, the low pressure drive shaft 34 may be coupled to the fan rotor assembly 38 via a speed reduction device 37 (e.g., a reduction gear or gearbox or a transmission) to provide an indirect-drive or geared drive configuration. Such a speed reduction device(s) 37 may also be provided between any other suitable shafts and/or spools within the engine as desired or required.

During operation of the engine 10, it should be appreciated that an initial air flow (indicated by arrow 50) may enter the engine 10 through an associated inlet 52 of the fan casing 40. For the illustrated embodiment, the air flow 50 then passes through the fan blades 44 and splits into a first compressed air flow (indicated by arrow 54) that moves through conduit 48 and a second compressed air flow (indicated by arrow 56) which enters the booster compressor 22. In the depicted embodiment, the pressure of the second compressed air flow 56 is then increased and enters the high pressure compressor 24 (as indicated by arrow 58). After mixing with fuel and being combusted within the combustor 26, the combustion products 60 may exit the combustor 26 and flow through the high pressure turbine 28. Thereafter, for the shown embodiment, the combustion products 60 flow through the low pressure turbine 32 and exit the exhaust nozzle 36 to provide thrust for the engine 10.

In certain embodiments, the engine 10 may be an adaptive cycle engine or a variable cycle engine. Gas turbine engines 10 may balance performance between energy efficiency and high thrust production by designing a by-pass ratio between the airflow conduit 48 and the core gas turbine engine 14. The by-pass ratio may be defined by the ratio of the first compressed airflow 54 that moves through the airflow conduit 48 and the second compressed air flow 56 that moves through the core gas turbine engine 14. Generally a gas turbine engine 10 with a high by-pass ratio corresponds to an efficient gas turbine engine 10, but the gas turbine engine 10 may have a relatively lower maximum thrust. Similarly, a gas turbine engine 10 with a low by-pass ratio may have a higher maximum thrust, but the gas turbine engine 10 may have a lower efficiency.

Adaptive cycle engines or variable cycle engines may incorporate a variable by-pass ratio design. For example, the by-pass ratio may be adjusted to a lower value when high thrust is required, such as take-off conditions. Similarly, the by-pass ratio may be adjusted to a higher value when high efficiency is desired, such as at cruise conditions. The adjustment of the by-pass ratio may be accomplished by modify the area of the airflow conduit 48 and the inlet of the core gas turbine engine 14. In another embodiment, additional ducts may be used to selectively pass more or less air to either the core gas turbine engine 14 or the airflow conduit 48.

Referring generally to FIG. 3-7, various views of embodiments of a rotor thrust balancing system 200 for a turbomachine, such as, but not limited to, the gas turbine engine 10 of FIG. 1, are illustrated in accordance with aspects of the present subject matter. For reference purposes, the turbomachine defines a centerline 12 extending the length of the turbomachine. In the embodiment shown, the system 200 includes a rotating drive shaft 31, a thrust bearing 118, and a first waveguide sensor 201. For the embodiment shown, the rotating drive shaft 31 couples a turbine section 29 of the turbomachine and a compressor section 23 of the turbomachine. The thrust bearing 118 may include a plurality of ball bearings 132, an inner race 128, and an outer race 130. For the depicted embodiment, the inner race 128 is coupled to the rotating drive shaft 31, and the outer race 130 is coupled to a fixed structure, such as a thrust bearing compartment housing 102. In the exemplary embodiment, a first waveguide sensor 201 is coupled to the outer race 130 at a first end 204 of the first waveguide sensor 201. Further, the first waveguide sensor 201 may communicate a vibrational frequency from the thrust bearing 118 to a second end 206 of the first waveguide sensor 201.

Referring again to FIG. 1 particularly, the system 200 generally includes a rotating drive shaft 31 coupling a turbine section 29 and a compressor section 23 of the turbomachine. In one embodiment, the rotating drive shaft 31 is the high pressure drive shaft 30 coupling the high pressure turbine 28 to the high pressure compressor 24. Together, the high pressure turbine 28, the high pressure compressor 24, and the high pressure drive shaft 30 may be referred to as a high pressure spool 33. In another embodiment, the rotating drive shaft 31 is the low pressure drive shaft 34 coupling the low pressure turbine 32 to a low pressure compressor, such as the booster compressor 22, and the fan section 16. Alternatively, the low pressure drive shaft 34 may couple the low pressure turbine 32 to the booster compressor 22 only or to the fan section 16 only. Together, the low pressure turbine 32, the low pressure drive shaft 34, and at least one of the booster compressor 22 or fan section 16 may be referred to as a low pressure spool 35. In a further embodiment (not shown), the rotating drive shaft 31 may be an intermediate pressure drive shaft coupling an intermediate compressor to an intermediate turbine. Together, the intermediate pressure drive shaft, intermediate pressure compressor, and intermediate pressure turbine may be referred to as an intermediate pressure spool.

It should be recognized, in further embodiments, the invention may include any combination of the low pressure drive shaft 34, the high pressure drive shaft 30, and the intermediate pressure drive shaft. For example, both the high pressure drive shaft 30 and the low pressure drive shaft 34 may be coupled to thrust bearings 118 and waveguide sensors 202 as described in more detail below.

Figure 2:
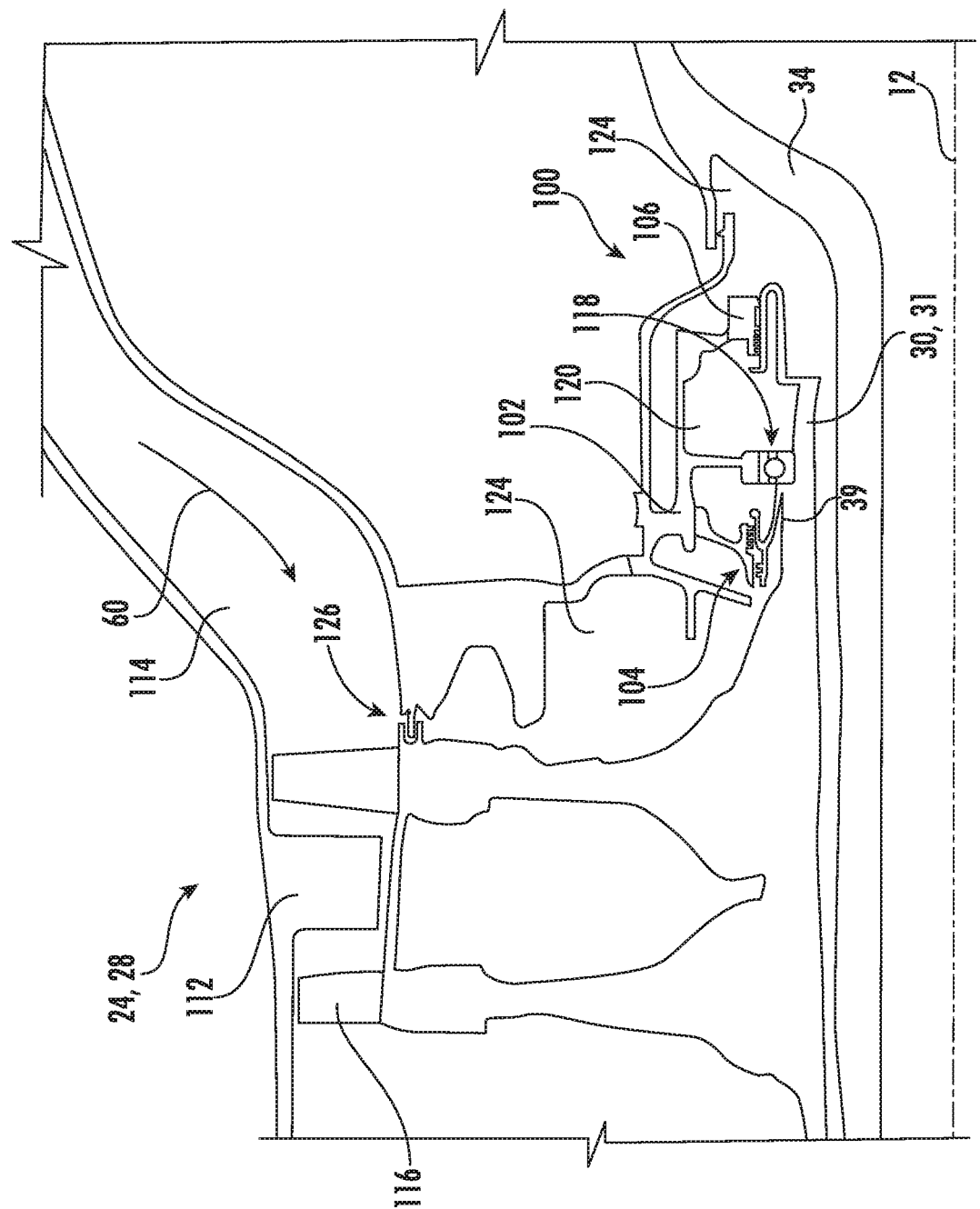
FIG. 2 is a cross-sectional view of one embodiment of a thrust bearing compartment sealing system for sealing a bearing compartment housing relative to a shaft of the gas turbine engine in accordance with aspects of the present subject matter.
Figure 3:
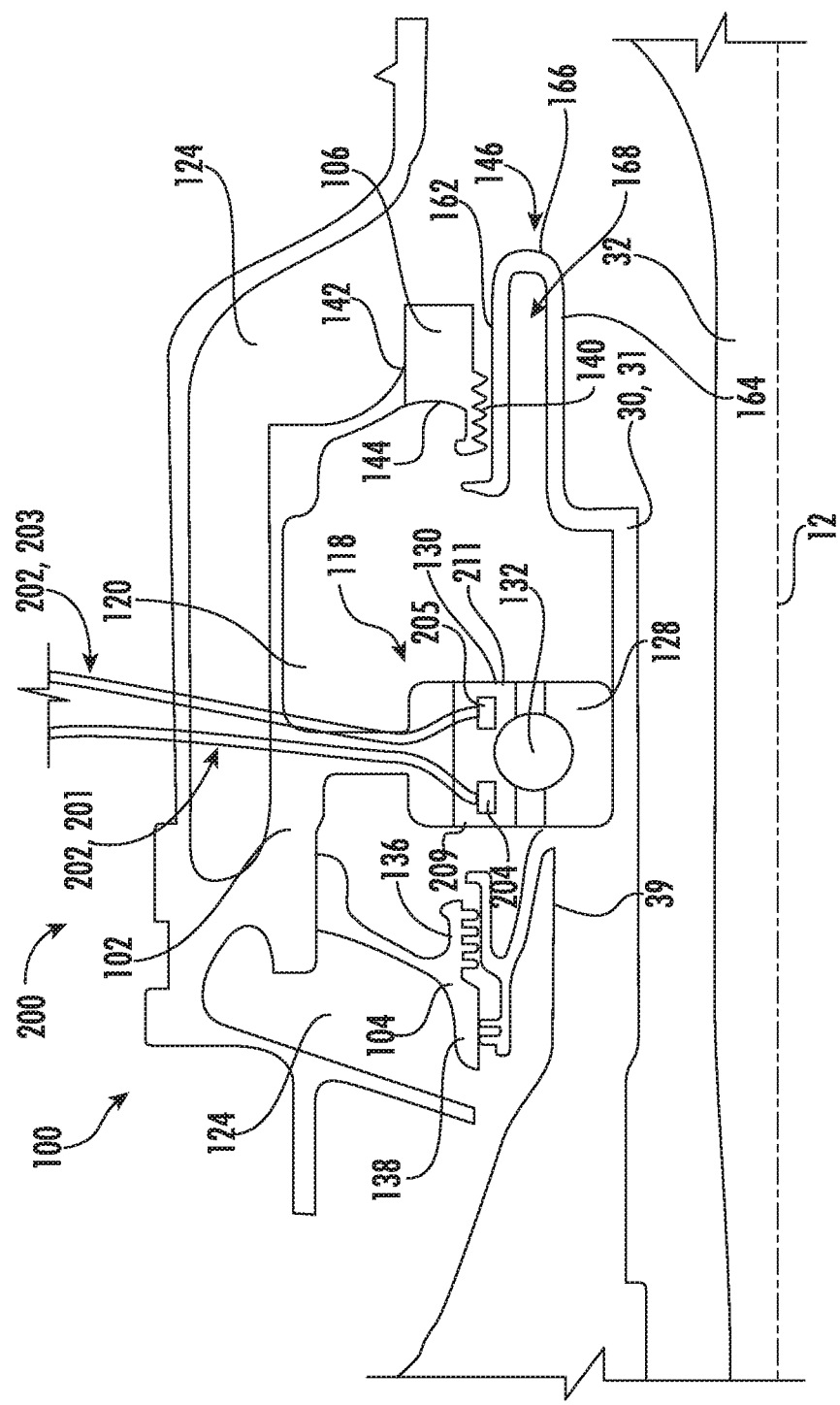
FIG. 3 is a close-up, cross-sectional view of the bearing compartment sealing system shown in FIG. 2, particularly illustrating a sealed compartment housing and waveguide sensors attached to the thrust bearing in accordance with aspects of the present subject matter.

Referring now to FIGS. 2-3, views of one embodiment of a bearing compartment sealing system 100 containing a thrust bearing 118 are illustrated in accordance with aspects of the present subject matter. Specifically, FIG. 2 is a cross-sectional view of the sealing system 100 for containing the lubrication of a thrust bearing compartment housing 102 relative to a rotating drive shaft 31 of the gas turbine engine 10. FIG. 3 is a close-up cross-sectional view of the sealing system 100 shown in FIG. 2, particularly illustrating a labyrinth seal 104 and a carbon seal 106, such as a hydrodynamic seal, disposed at axially opposite ends of the bearing compartment housing 102.

As shown in FIG. 2, the sealing system 100 may generally isolate a bearing compartment housing 102 from the high pressure drive shaft 30, which rotates relative thereto. Although, the sealing system 100 may isolate any stationary component and any rotating shaft (e.g., the low pressure drive shaft 34) in the engine 10. For the embodiment shown, the relative rotation occurs when one or more stator vanes 112 direct the combustion products 60 flowing through a conduit 114 onto one or more turbine blades 116 coupled to the high pressure drive shaft 30. A thrust bearing 118 supports the high pressure drive shaft 30 relative to various fixed components in the engine 10. Further, for the illustrated embodiment, the bearing compartment housing 102 at least partially radially encloses the thrust bearing 118, thereby forming a sump or compartment 120 preferably having a radial shape in which the thrust bearing 118 is disposed. Lubricant (e.g., oil) for lubricating the various components of the thrust bearing 118 may circulate through the compartment 120. For the illustrated embodiment, a high pressure cavity 124 is disposed exterior to the bearing compartment housing 102. In the exemplary embodiment, bleed air from the compressor section 23, the turbine section 29, and/or the fan section 16 flows through a bleed air port 126 to pressurize the high pressure cavity 124 to a pressure relatively greater than the pressure in the compartment 120.

For the depicted embodiment, at least two seals, such as the labyrinth seal 104 and the carbon seal 106, separate the high pressure drive shaft 30 and the bearing compartment housing 102. Although, the at least two seals may be any suitable type of seal. For example, in other embodiments, multiple lab seals, carbon seals, and/or hydrodynamic seals may be utilized in the sealing system 100. For the illustrated embodiment, the labyrinth seal 104 and the carbon seal 106 separate the high pressure cavity 124 and the compartment 120. FIG. 2 illustrates the labyrinth seal 104 disposed upstream of the carbon seal 106; although, the carbon seal 106 may be positioned downstream of the labyrinth seal 104 as well.

In this respect, for the illustrated embodiment, the bearing compartment housing 102, the at least two seals (e.g., the labyrinth seal 104 and the carbon seal 106), and the high pressure drive shaft 30 collectively enclose the compartment 120. That is, the combination the bearing compartment housing 102, the at least two seals, and the high pressure drive shaft 30 may entirely surround the compartment 120 axially, radially, and circumferentially. Furthermore, for the illustrated embodiment, the at least two seals (e.g., the labyrinth seal 104 and the carbon seal 106) are the only seals that enclose the compartment 120, but it should be recognized that in other embodiment any number of seal may be used to enclose the compartment 120, such as three or more.

In the embodiment illustrated in FIG. 3, a close-up view of the thrust bearing 118 and bearing compartment housing 102 is shown. For example, the bearing 118 includes an inner race 128 extending circumferentially around an outer surface 39 of the high pressure drive shaft 30. In the shown embodiment, an outer race 130 is disposed radially outward from the inner race 128 and mates with a fixed structure, such as the interior surface of the bearing compartment housing 102. The inner and outer races 128, 130 may have a split race configuration. For the depicted embodiment, the inner and outer race 128, 130 sandwich at least one ball bearing 132 therebetween. Preferably, the inner and outer races 128, 130 sandwich at least three ball bearings 132 therebetween. In other embodiments, the inner race 128 and outer race 130 may sandwich at least one cylinder to form the thrust bearing 118.

FIG. 3 also more closely illustrates the labyrinth seal 104 and the carbon seal 106. For the embodiment depicted, the labyrinth seal 104 and the carbon seal 106 (such as a hydrodynamic seal) are non-contact seals, which require no contact between the stationary and moving components when operating at high speed. Non-contact seals typically have a longer service life than contact seals. Still, in other embodiments, one or both of the seals may be contact seal. Each type of seal may operate in a different manner. For the depicted embodiment, the labyrinth seal 104 includes inner surface 136 and an outer surface 138. For example, a tortuous path (not shown) extending between the inner and outer surfaces 136, 138 prevents lubricant from escaping the bearing compartment houses 102. For the exemplary embodiment shown, the air pressure on an outer side 138 of the labyrinth seal 104 (i.e., in the high pressure cavity 124) is greater than the air pressure on the inner side 136 of the labyrinth seal 104 (i.e., in the compartment 120). In this respect, the stationary and rotating components may be separated by an air film during relative rotation therebetween.

Nevertheless, for the embodiment shown, the carbon seal 106, such as a hydrodynamic seal, includes one or more grooves 140 separating the stationary and rotating components. The air pressure on an outer side 142 of the carbon seal 106 (i.e., in the high pressure cavity 124) may be greater than the air pressure on the inner side 144 of the carbon seal 106 (i.e., in the compartment 120). As such, for the embodiment shown, air from the high pressure cavity 124 flows through the grooves 140 into the compartment 120, thereby creating an air film between the stationary and rotating components. Still, in other embodiments, the carbon seal 106 may be a contacting carbon seal.

In one embodiment, the carbon seal 106 is proximate to and in sealing engagement with a hairpin member 146 of the high pressure drive shaft 30. For example, the hairpin member 146 includes a radially outer shaft portion 162 radially offset from a radially inner shaft portion 164 by a radial wall 166. In this respect, for the embodiment depicted, the radially outer shaft portion 162, the radially inner shaft portion 164, and the radial wall 166 define a cavity 168 therebetween. In one embodiment, the radially outer shaft portion 162 is in sealing engagement with the carbon seal 106. In this respect, the radially outer shaft portion 162 may contact the carbon seal 106 when the high pressure drive shaft 30 is stationary or rotating at low speeds. Nevertheless, for the illustrated embodiment, the carbon seal 106 lifts off of the radially outer shaft portion 162 when the high pressure drive shaft 30 rotates at high speeds.

For the embodiment illustrated, the hairpin member 146 may improve the performance of the gas turbine engine 10. For example, lubricant from the compartment 120 is able to contact and cool the radially inner side of the radially outer shaft portion 162 of the hairpin member 146. This, for the embodiment shown, cools the radially outer side of the radially outer shaft portion 162, which is in contact with the carbon seal 106 at low speeds and proximate to the carbon seal 106 at high speeds. That is, heat from the radially outer side may conduct through the radially outer shaft portion 162 to the radially inner side thereof, which is cooled by lubricant. This keeps the carbon seal 106 cooler, which, in turn, permits the gas turbine engine 10 to run hotter and faster, thereby improving the performance thereof for the illustrated embodiment.

For the shown embodiment, the pressure on the outer side 138 of the labyrinth seal 104 and the outer side 142 of the carbon seal 106 should be substantially the same. That is, the air pressure in the high pressure cavity 124 should be substantially the same throughout to prevent the creation of air flow currents. These air currents could direct air away from the carbon seal 106.

Figure 4:
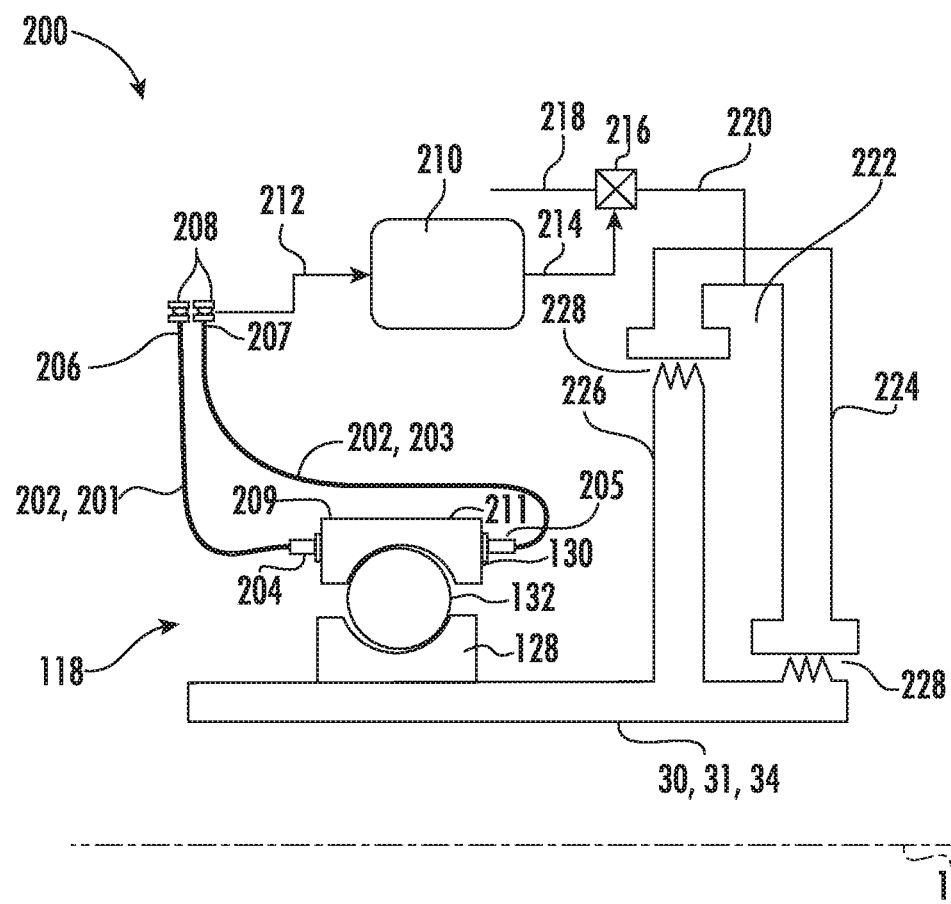
FIG. 4 is a view of a system for balancing rotor thrust on a thrust bearing in accordance with aspects of the present subject matter.

Referring now to FIG. 4, a view of a rotor thrust balancing system 200 for a turbomachine is illustrated in accordance with aspects of the present subject matter. For the illustrated embodiment, the system 200 includes at least one waveguide sensor 202, such as the first waveguide sensor 201, coupled to the outer race 130 of the thrust bearing 118 at a first end 204, 205 of the waveguide sensor 202. It should be recognized the inner race 128 may be coupled to any rotating drive shaft 31. For example, the rotating drive shaft 31 may be the high pressure drive shaft 30. In another embodiment, the rotating drive shaft 31 may be the low pressure drive shaft 34.

It should be recognized that, in other embodiments, the waveguide sensor 202 may be coupled to the bearing compartment housing 102. As shown in the embodiment of FIG. 4, the waveguide sensor 202 communicates a vibrational frequency from the thrust bearing 118 to a second end 206, 207 of the waveguide sensor 202. The terms "communicating," "communicative," "communication," "communicates," "communicatively," and variation of the preceding, as used herein, mean direct communication or indirect communication such as through a memory system or another intermediary system.

The vibrational frequency communicated from the waveguide sensor 202 may generally be used to evaluate the health of any bearing. For example, a cracked or worn ball bearing 132 may alter a frequency of the thrust bearing 118. As such, a change in a frequency communicated by the waveguide sensor 202 may indicate a ball bearing 132 that needs maintenance or replacement. Further, a change in the frequency of the thrust bearing 118 may also indicate a damaged or defective inner race 128 or the outer race 130. As such, in certain embodiments, the system 200 may be used to monitor bearing health, such as the health of a thrust bearing 118.

The waveguide sensor 202 as described here may include a structure that guides waves along a path while reducing the loss of energy. For instance, the waveguide reduces the loss of energy or signal decay by restricting expansion to along one or two dimensions. In embodiments of the disclosed system 200, the waveguide sensor 202 communicates vibrations or sonic waves along the length of the waveguide sensor 202 from the first end 204, 205 to the second end 206, 207. For example, the waveguide sensor 202 may be a metal wire extending the length of the waveguide sensor 202 at least partially enclosed within a sheath. The metal wire may be directly mounted to a bearing of interest, such as the thrust bearing 118, or the bearing compartment housing 102. For the depicted embodiment, waveguide sensors 202 are mounted on both a forward end 209 and an aft end 211 of the thrust bearing 118. As such, the waveguide sensors 202 may sense both low rotor thrust and determine the direction the thrust bearing 118 is loaded, as described in more detail below.

Further, the waveguide sensor 202 may allow a measuring device to receive signals at the second end 206, 207 that originate at the first end 204, 205. More specifically, for the embodiment shown, the waveguide sensor 202 communicates a vibrational signal from the thrust bearing 118 to the exterior of the engine 10, outside the core gas turbine engine 14, or both. As such, the second end 206, 207 of the waveguide sensor 202 may be located outside the engine 10, outside the core gas turbine engine 14, or both.

In certain embodiments, the system 200 includes a control sensor at the second end 206, 207 of the waveguide sensor 202. Still referring to FIG. 4, the control sensor may be a piezoelectric sensor 208. The piezoelectric sensor 208 described here may include a device that uses the piezoelectric effect to determine changes in pressure, acceleration, temperature, strain, or force by converting them into an electric charge. For example, piezoelectric sensors 208 are known that generate a change in voltage when deformed by a force. As such, some piezoelectric sensors 208 produce a readable fluctuation in voltage or current when exposed to a vibration, such as the vibrational frequency communicated to the second end 206, 207 of the waveguide sensor 202 and subsequently to the piezoelectric sensor 208.

Referring now to FIGS. 3-4, in the embodiments illustrated, the system 200 may include a first waveguide sensor 201 and a second waveguide sensor 203. More specifically, the first end 204 of the first waveguide sensor 201 may be coupled to the outer race 130 at a forward end 209 relative to the centerline 12. Similarly, the first end 205 of the second waveguide sensor 203 may be coupled to the outer race 130 at an aft end 211 relative to the centerline 12. It should be recognized that in further embodiments the system 200 may include only one waveguide sensor 202 or may include three or more waveguide sensors 202

Further, the vibrational frequency communicated by the waveguide sensor 202 may be any frequency associated with a bearing. For example, the vibrational frequency communicated may be a ball passing frequency. For the embodiment depicted, the ball passing frequency may be the rate at which the ball bearing 132 passes a particular location on one of the races 128, 130. The term ball passing frequency may generally refer to the ball passing frequency on the inner race 128 or the ball passing frequency on the outer race 130. The ball passing frequency may be analytically predicted based on thrust bearing 118 geometry and rotor speed. For instance, a degree of curvature of the races 128, 130, an internal radial clearance between the inner race 128 and outer race 130, and the number of ball bearings 132 may be used to predict the ball passing frequency.

In the embodiment shown, the waveguide sensor 202 is coupled to the outer race 130. As such, the ball passing frequency communicated by the waveguide sensor 202 may the outer ball passing frequency. In the case of a cross-over condition, neither a forward or aft force is applied to the bearing. Such a condition may lead to an unloaded ball bearing 132 that slips instead of rotating smoothly. For example, the ball bearing 132 may skid on the inner race 128 instead of rotating. As such, the ball passing frequency on the outer race 130 may drop indicating a bearing slip and therefore a crossover condition on the thrust bearing 118. For example, the ball passing frequency may drop approximately five percent to ten percent below the predicted value, indicating a bearing slip. Further, the ball passing frequency may drop to approximately zero, indicating a bearing that is in a near full slip condition.

Referring now particularly to FIG. 4, the system 200 may include a control system communicatively linked to the control sensor (e.g. the piezoelectric sensor 208) located at the second end 206, 207 of the waveguide sensor 202. For example, the first waveguide sensor 201 may have a second end 206. Similarly, the second waveguide sensor 203 may have a second end 207. As such, the vibrational frequency, such as the ball passing frequency, may be communicated to the control system. For example, the system 200 may include a Full Authority Digital Engine Control (FADEC) system 210 in communication with the piezoelectric sensor 208 via a communicative cable 212. For the embodiment shown, the piezoelectric sensor 208 communicates the ball passing frequency of the thrust bearing 118 to the FADEC 210 of the engine 10.

For the shown embodiment, once the ball passing frequency has been communicated to the control system, the control system determines whether the thrust bearing 118 is in a cross-over condition. For example, the FADEC 210 may receive a signal from the piezoelectric sensor 208 via communicative cable 212 and determine if the ball passing frequency is below a first threshold. In one exemplary embodiment, ball passing frequencies below the first threshold may correspond to a thrust bearing 118 in the cross-over condition.

Further, the system 200 may be used to determine and monitor the direction of the rotor thrust using the two waveguide sensors 201, 203. For example, the FADEC 210 may receive signals from the piezoelectric sensors 208 coupled to the waveguide sensors 201, 203. As such, for the embodiment illustrated, the FADEC 210 receives the ball passing frequency at both the forward end 209 and the aft end 211 on the outer race 130. While the frequency of the ball passing frequency at both locations may be the same, the magnitude of the ball passing frequency may be different. For example, a forward acting rotor thrust may create a higher magnitude of the ball passing frequency on the forward end 209 of the outer race 130. Conversely, an aft acting rotor thrust may create a higher magnitude of the ball passing frequency on the aft end 211 of the outer race 130. As such, for the embodiment shown, the FADEC 210 compares the magnitude of the ball passing frequency at both the forward and aft ends 209, 211 of the outer race 130 and determines the direction of the rotor thrust acting on the thrust bearing 118 and high pressure drive shaft 30.

Referring now to FIGS. 4-7 generally and to FIG. 4 particularly, the system 200 may change a force acting on the high pressure drive shaft 30 to remove the thrust bearing 118 out of the cross-over condition. For example, the system 200 may include a thrust cavity 222 in contact with the high pressure drive shaft 30. For the depicted embodiment, a changing pressure of the thrust cavity 222 moves the high pressure drive shaft 30 forward or aft relative to the centerline 12 of the engine 10. For instance, the thrust cavity 222 may be defined by a fixed structure 224, a rotating structure 226, and at least one thrust cavity seal 228. The thrust cavity seals 228 may be any seal known in the art, such as but not limited to, a labyrinth seal, a hydrodynamic seal, or a carbon seal 106. For example, a changing pressure in the thrust cavity 222 may modify the force the thrust cavity 222 applies on the rotating structure 226. It should be recognized, for the depicted embodiment, that the high pressure drive shaft 30 includes the rotating structure 226. For instance, the rotating structure 226 may be coupled to the high pressure drive shaft 30 or may be formed in a single piece with the high pressure drive shaft 30. Thus, for the illustrated embodiment, the force applied to the rotating structure 226 of the high pressure drive shaft 30 is transferred to the thrust bearing 118 to push it away from the cross-over condition either forward or aft.

It should also be recognized that the gas engine 10 may include one or more radial bearing 119 positioned between the rotating drive shaft 31 or the rotating structure 226 and the fixed structure 224. The radial bearing 119 may generally support the rotating drive shaft 31 from radial forces perpendicular relative to the centerline 12

Further, the control system, such as the FADEC 210, may send a signal in response to a cross-over condition in the thrust bearing 118 to pressurize the thrust cavity 222. For example, the FADEC 210 may communicate a signal via a communicative cable 214 to a valve 216 to increase or reduce the pressure supplied to the thrust cavity 222. For the depicted embodiment, the valve 216 is coupled to the high pressure compressor 24 and receives a pressurized fluid, such as air, via a first line 218. Further, in the embodiment shown, the valve 216 is coupled to the thrust cavity 222 via a second line 220. As such, for the embodiment shown, the signal from the FADEC 210 selectively opens the valve 216 so that bleed air pressurizes the thrust cavity 222 via the second line 220. It should be recognized that the pressurized fluid may originate from any source, such as, but not limited to, the booster compressor 22, the high pressure turbine 28, the low pressure turbine 32, or a pump. Furthermore, the thrust cavity 222 may be used to remove the thrust bearing 118 from a crossover condition by bleeding air from the thrust cavity 222, thus reducing the force applied to the high pressure drive shaft 30.

In one embodiment, the FADEC 210 is closed loop control system. For example, an initial set point or range may be selected for a difference between the magnitudes of the ball passing frequency at the forward end 209 to the ball passing frequency at the aft end 211 of the outer race 130. Such a difference may represent a thrust bearing 118 loaded in the forward or aft direction by a desirable thrust load. In one embodiment, the FADEC 210 may compare the actual difference between the ball passing frequencies and the set point and calculate an adjustment representing the difference between the set point and the actual difference. Further, the FADEC 210 may then use this adjustment as an input to modify the force applied by the thrust cavity 222 on the rotating structure 226. As such, the closed loop control system may keep the thrust bearing 118 at the desired set point or range.

Figure 5:
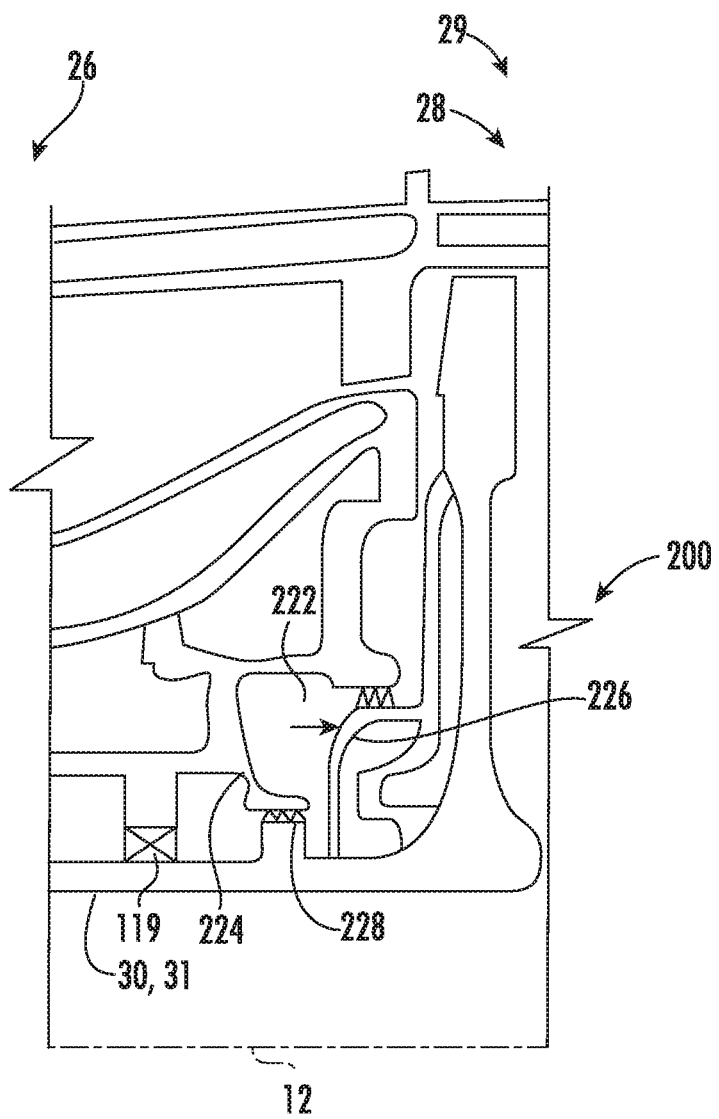
FIG. 5 is a schematic view of a thrust cavity to be used in the system of FIG. 4 located in the turbine section of a turbomachine in accordance with aspects of the present subject matter.

Referring now particularly to FIG. 5, a schematic view of one embodiment of a thrust cavity 222 located in the turbine section 29 of the engine 10 is illustrated according to aspects of the present subject matter. As shown, for the illustrated embodiment, the thrust cavity 222 is defined by a fixed structure 224, a rotating structure 226, and two thrust cavity seals 228. In the exemplary embodiment, the thrust cavity 222 may modify a force either forward or aft on the rotating drive shaft 31 relative to the centerline 12. For example, an increasing pressure supplied to the thrust cavity 222 increases pressure on the rotating structure 226 and may apply a force on the rotating drive shaft 31, such as the high pressure drive shaft 30, in the aft direction. Similarly, for the embodiment shown, a decreasing pressure supplied to the thrust cavity 222 decreases the pressure on the rotating structure 226 and may allow the net force on the high pressure drive shaft 30 to move the high pressure drive shaft 30 in the forward direction. It should be recognized, for the exemplary embodiment, that either an increase or a decrease in pressure may be used to change the force acting on the high pressure drive shaft 30 and move the thrust bearing 118 out of a cross-over condition. It should be recognized that, in other embodiments, the thrust cavity 222 may be located in the compressor section 23 and the rotating drive shaft 31 may be the low pressure drive shaft 34.

Figure 6:
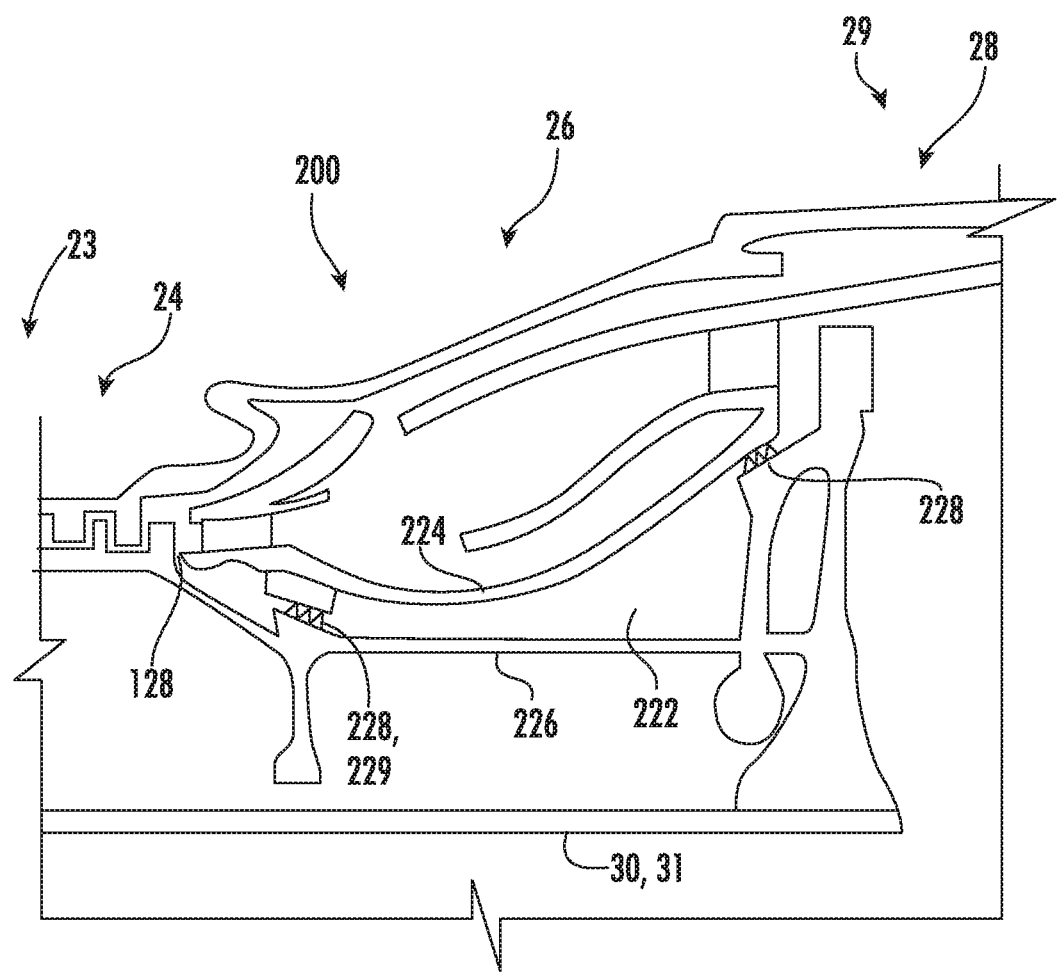
FIG. 6 is a schematic view of a thrust cavity to be used in the system of FIG. 4 located at the compressor discharge pressure seal of a turbomachine in accordance with aspects of the present subject matter.

Referring now particularly to FIG. 6, a schematic view of one embodiment of a thrust cavity 222 located aft of the high pressure compressor section 24 is illustrated according to aspects of the present subject matter. In the shown embodiment, one thrust cavity seal 228 is at least partially defined by a compressor discharge pressure (CDP) seal 229. For example, the CDP seal 229 may be any type of seal known in the art, such as, but not limited to, a labyrinth seal 104. For the embodiment shown, the thrust cavity 222 is pressurized by leaking air through the bleed air port 126 from the high pressure compressor section 24. For instance, pressurized air from the bleed air port 126 may pressurize the thrust cavity 222 though the CDP seal 229. The thrust cavity 222, in the shown embodiment, is defined by the thrust seals 228, the fixed structure 224, and the rotating structure 226. As such, the force applied to the high pressure drive shaft 30 may be modified by changing the pressure in the thrust cavity 222 to supply more or less pressure to the rotating structure 226. More particularly, for the illustrated embodiment, more or less air may be bled from the high pressure compressor section 24.

It should be recognized that in further embodiments the force acting on the rotating structure 226 may be modified by changing the volume of the thrust cavity 222. More particularly, increasing the volume of the thrust cavity 222 may increase the surface area of the rotating structure 226. As such, the pressure in the thrust cavity 222 may act on a larger surface area and generate a greater force on the high pressure drive shaft 30. Similarly, decreasing the volume of the thrust cavity 222 may decrease the surface area of the rotating structure 226. As such, the pressure in the thrust cavity 222 may act on a smaller surface area and generate less force on the high pressure drive shaft 30.

Figure 7:
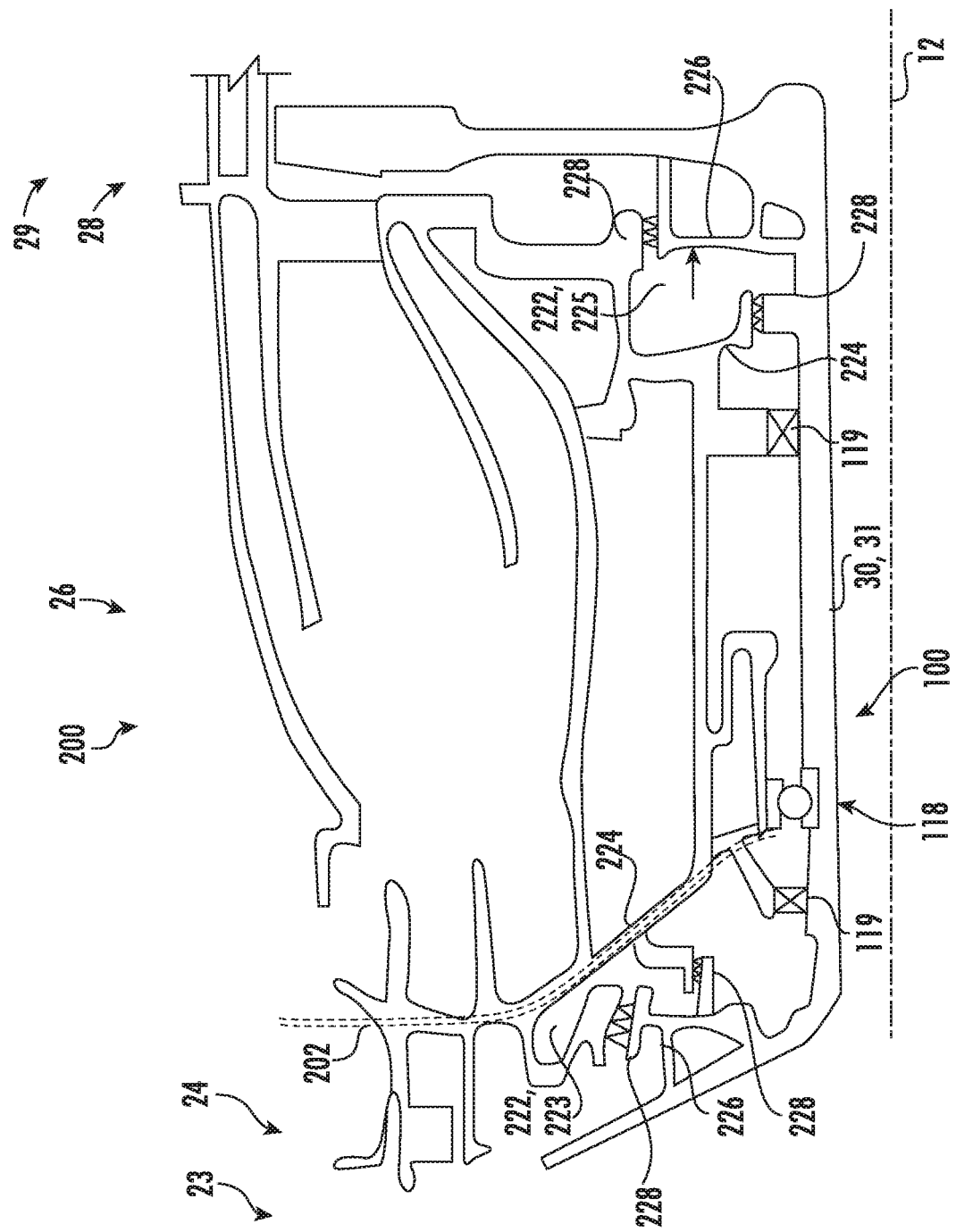
FIG. 7 is a schematic view of two thrust cavities to be used in the system of FIG. 4 with one thrust cavity forward of the thrust bearing and the other aft of the thrust bearing in accordance with aspects of the present subject matter.

Referring now to FIG. 7, an embodiment of the system 200 for balancing rotor thrust is illustrated using two thrust cavities 222 according to aspects of the present disclosure. For example, the system 200 may include a first thrust cavity 223 forward of the thrust bearing 118, such as at or near the high pressure compressor 24. Further, for the illustrated embodiment, the system 200 includes a second thrust cavity 225 aft of the thrust bearing 118, such as at or near the high pressure turbine 28. As shown, the pressure in the first thrust cavity 223 may be increased in order to apply a forward force on the rotating structure 226 and the high pressure drive shaft 30. Similarly, the pressure in the second thrust cavity 225 may be increased in order to apply an aft force to the rotating structure 226 and the high pressure drive shaft 30. As such, the system 200 may move the thrust bearing 118 from a cross-over condition by apply a force to the rotating drive shaft 31, such as the high pressure drive shaft 30, either forward or aft by increasing the pressure in the first thrust cavity 223 or the second thrust cavity 225 respectfully. Further, FIG. 7 illustrates the waveguide sensor 202 extending outside of the engine 10, such as to a control system.

It should be recognized that the system 200 may balance the rotor thrust on the thrust bearing 118 using any thrust cavity 222 in contact with a rotating drive shaft 31. For example, any sealed cavity in contact with the rotating drive shaft 31 or a rotating structure 226 coupled to the rotating drive shaft 31 may be pressurized to supply a force axially to the rotating drive shaft 31. Further, the system may be used to balance rotor thrust on the low pressure drive shaft 34 or an intermediary pressure drive shaft.

Figure 8:
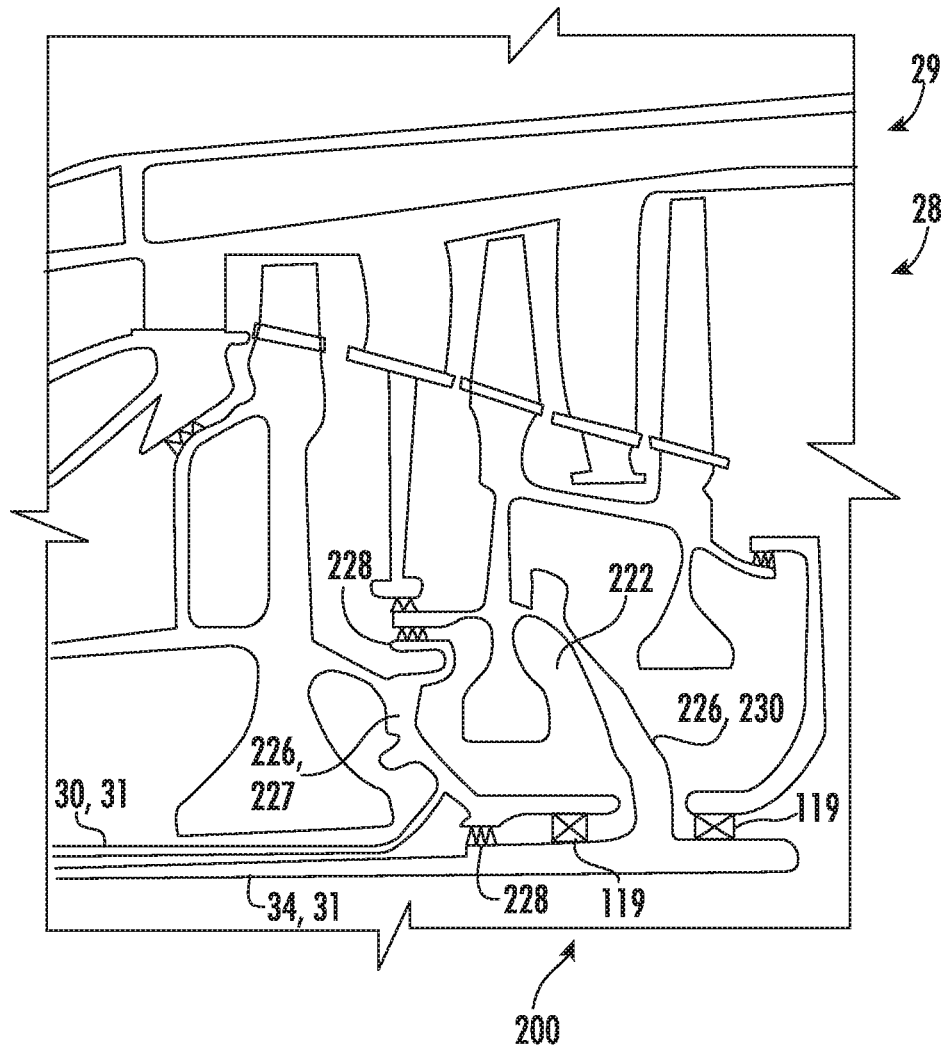
FIG. 8 is a schematic view of a thrust cavity bounded by two rotating structures in accordance with aspects of the present subject matter.

Referring now to FIG. 8, a schematic view of one embodiment of a thrust cavity 222 located in the turbine section 29 and including two rotating structures 226 is illustrated according to aspects of the present subject matter. As shown, for the illustrated embodiment, the thrust cavity 222 is defined by a first rotating structure 227 coupled to the high pressure drive shaft 30, a second rotating structure 230 coupled to the low pressure drive shaft 34, and a plurality of thrust cavity seals 228. In the exemplary embodiment, an increasing pressure supplied to the thrust cavity 222 increases pressure on the rotating structures 227, 230. For example, an increasing pressure may apply a forward force on the first rotating structure 227 and thus a forward force on the high pressure drive shaft 30. Similarly, for the embodiment shown, an increasing pressure may apply an aft force on the second rotating structure 230 and thus an aft force on the low pressure drive shaft 34. Thus, for the embodiment shown, the thrust cavity 222 allows for a linked high pressure and low pressure drive shaft 30, 34 adjustment.

It should be recognized that, for the illustrated embodiment, a decreasing pressure may supply a decreased force on both the first rotating structure 227 and the second rotating structure 230. For instance, a decreasing pressure supplied to the thrust cavity 222 decreases the pressure on the first rotating structure 227 and may allow the net force on the high pressure drive shaft 30 to move the high pressure drive shaft 30 in the aft direction. Similarly, for the embodiment shown, a decreasing pressure supplied to the thrust cavity 222 decreases the pressure on the second rotating structure 230 and may allow the net force on the low pressure drive shaft 34 to move the low pressure drive shaft 34 in the forward direction.

Figure 9:
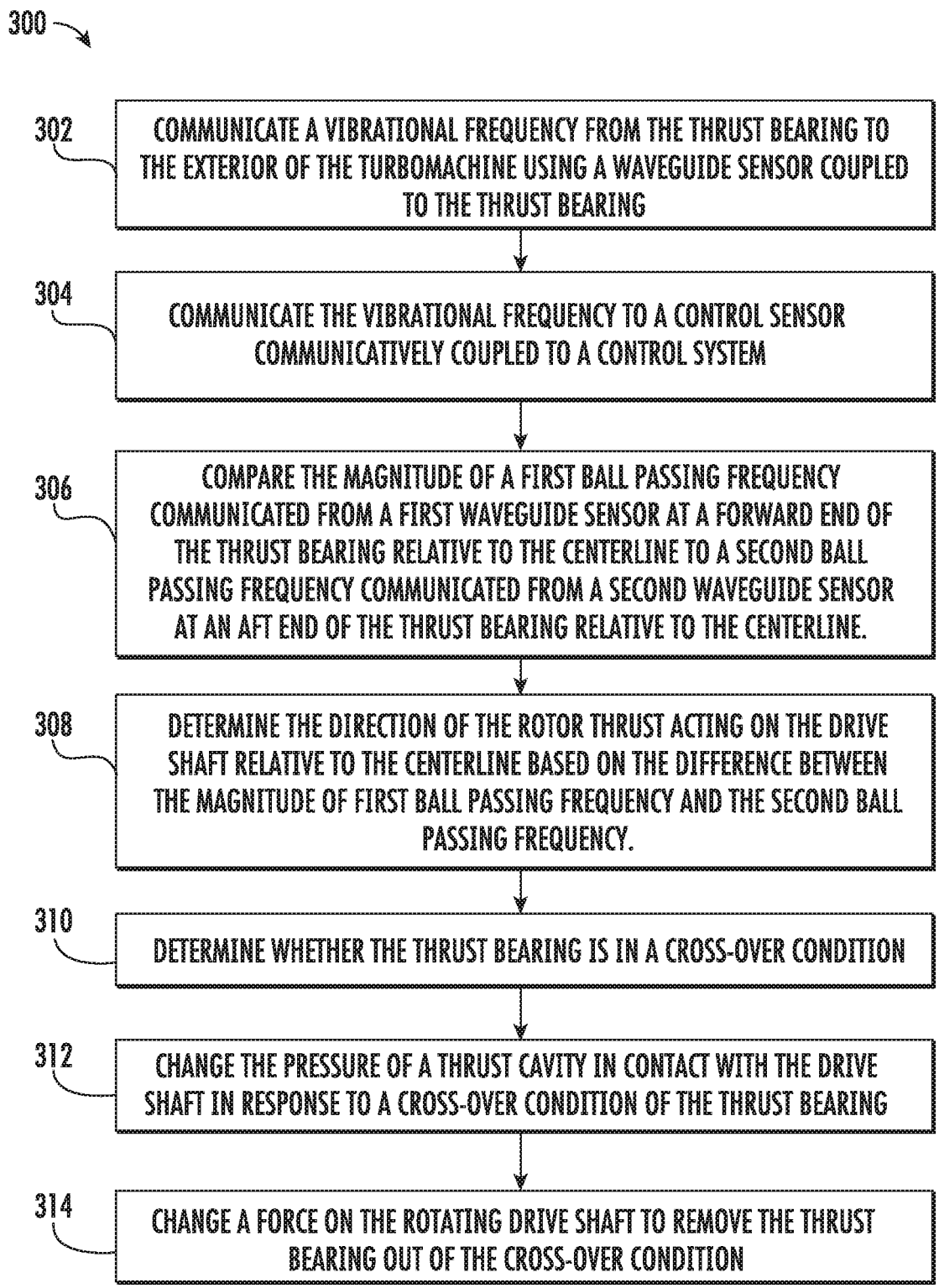
FIG. 9 is a flow chart of a method of using the system for balancing rotor thrust on a thrust bearing in accordance with aspects of the present subject matter.

Referring now to FIG. 9, a flow diagram of one embodiment of a method 300 for balancing rotor thrust on a thrust bearing 118 of a turbomachine is illustrated in accordance with aspects of the present disclosure. The method 300 may be used on any turbomachine, such as, but not limited to the gas turbine engine 10 of FIG. 1. Further, the method 300 may be used generally with the system 200 described in FIGS. 2-8 or with any other capable system.

At step 302, the method 300 may include communicating a vibrational frequency from the thrust bearing 118 to the exterior of the turbomachine using a waveguide sensor 202 coupled to the thrust bearing 118. In certain embodiments, the vibrational frequency is a ball passing frequency, such as the ball passing frequency on the outer race 130 of the thrust bearing 118. In the exemplary embodiment, another step 304 includes communicating the vibrational frequency to a control sensor communicatively coupled to a control system. In one embodiment, the control sensor is the piezoelectric sensor 208. The control system may be the FADEC control system 210 of FIG. 4.

In one embodiment, the method 300 includes at 306 comparing the magnitude of a first ball passing frequency communicated from a first waveguide sensor 201 at a forward end 209 of the thrust bearing 118 relative to the centerline 12 to a second ball passing frequency communicated from a second waveguide sensor 203 at an aft end 211 of the thrust bearing 118 relative to the centerline 112. Further, the method 300 may include at 308 determining the direction of the rotor thrust acting on a rotating drive shaft 31 relative to the centerline 12 based on the difference between the magnitude of first ball passing frequency and the second ball passing frequency. It should be recognized that the rotating drive shaft 31 may be the high pressure drive shaft 30, the low pressure drive shaft 34, or any other suitable drive shaft.

At 310, the exemplary method 300 includes determining whether the thrust bearing 118 is in a cross-over condition. For example, determining the cross-over condition may include determining if a ball passing frequency of the thrust bearing 118 is below a first threshold. For instance, a ball passing frequency below the first threshold for the system 200 may indicate the thrust bearing 118 is in a cross-over condition. In the depicted embodiment, another step 312 includes changing the pressure of a thrust cavity 222 in contact with a rotating drive shaft 31 in response to a cross-over condition of the thrust bearing 118. For example, the method 300 may include communicating a signal from the control system, such as a FADEC system 210, to a valve 216. For certain embodiments, the valve 216 is coupled to and receives a pressurized fluid from a compressor section 23 of the turbomachine (e.g. the engine 10) and selectively transfers the pressurized fluid to a thrust cavity 222 in contact with the rotating drive shaft 31. In other embodiments, the pressurized fluid may be received from the turbine section 29. For the depicted embodiment, the pressure in the thrust cavity 222 acts on a rotating structure 226 defining the thrust cavity 222. As such, the exemplary method 300 includes at 314 changing a force on a rotating drive shaft 31, such as the high pressure drive shaft 30 or the lower pressure drive shaft 34, to remove the thrust bearing 118 out of the cross-over condition. For instance, the changing pressure of the thrust cavity 222 may modify the pressure acting on the area of the rotating structure 226. This changing pressure may modify the force applied to the rotating drive shaft 31.

Figure 10:
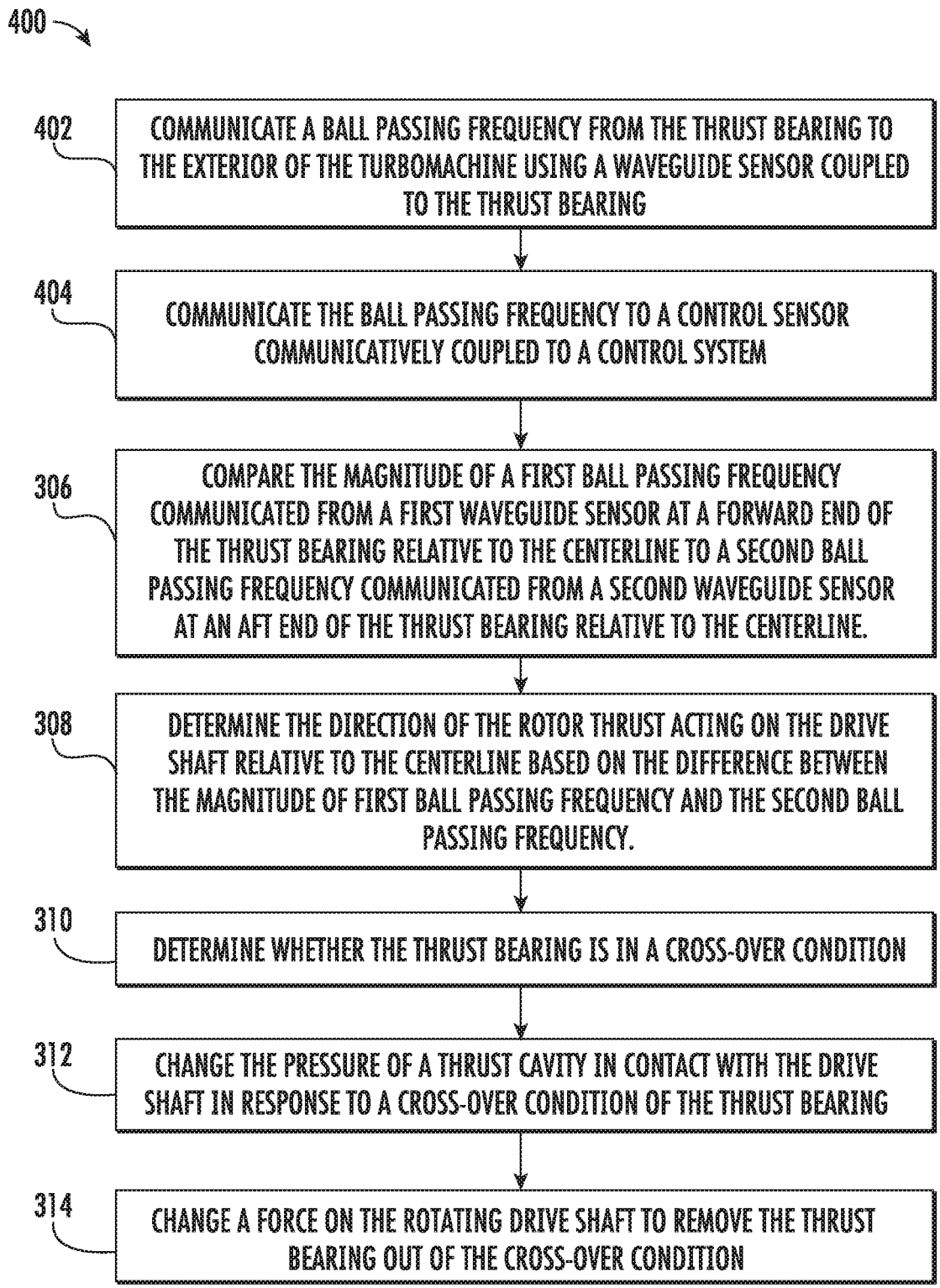
FIG. 10 is a flow chart of another method of using the system for balancing rotor thrust on a thrust bearing in accordance with aspects of the present subject matter.

Referring now to FIG. 10, a flow diagram of another embodiment of a method 400 for balancing rotor thrust on a thrust bearing 118 of the turbomachine is illustrated in accordance with aspects of the present disclosure. The method 400 may generally have similar steps to the method 300. For example, the method 400 may share steps 306-314 with the method 300. At step 402, the method 400 may include communicating a ball passing frequency from the thrust bearing 118 to the exterior of the turbomachine using a waveguide sensor 202 coupled to the thrust bearing 118. In the exemplary embodiment, another step 404 includes communicating the ball passing frequency to a control sensor communicatively coupled to a control system. In one embodiment, the control sensor is the piezoelectric sensor 208. The control system may be the FADEC control system 210 of FIG. 4.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor thrust balancing system for a turbomachine, wherein the turbomachine defines a centerline extending a length of the turbomachine, the system comprising:
   a rotating drive shaft coupling a turbine section and a compressor section of the turbomachine;
   a thrust bearing supporting the rotating drive shaft of the turbomachine, the thrust bearing comprising:
      a plurality of ball bearings;
      an inner race coupled to the rotating drive shaft; and
      an outer race coupled to a fixed structure;
   a first waveguide sensor coupled to the outer race at a first end of the waveguide sensor, wherein the waveguide sensor communicates a vibrational frequency from the thrust bearing to a second end of the waveguide sensor; and
   a valve configured to reduce or increase pressure supplied to a thrust cavity, wherein the thrust cavity modifies a force either forward or aft on the rotating drive shaft relative to the centerline.

2. The system of claim 1, further comprising:
   a second waveguide sensor, wherein the first end of the first waveguide sensor is coupled to a forward end of the outer race relative to the centerline and a first end of the second waveguide sensor is coupled to an aft end of the outer race relative to the centerline.

3. The system of claim 1, further comprising:
   a thrust cavity in contact with the rotating drive shaft, wherein the thrust cavity is pressurized to modify a force on the rotating drive shaft either forward or aft relative to the centerline.

4. The system of claim 3, wherein the thrust cavity is located at the turbine section of the turbomachine.

5. The system of claim 3, wherein the thrust cavity is located at the compressor section of the turbomachine.

6. The system of claim 1, wherein the first waveguide sensor comprises a second end located outside the turbomachine.

7. The system of claim 6, further comprising:
   a control sensor located at the second end of the first waveguide sensor to communicate the vibrational frequency of the thrust bearing to a control system of the turbomachine.

8. The system of claim 7, wherein the control system communicates with the valve to reduce or increase the pressure supplied to the thrust cavity.

9. The system of claim 7, wherein the control sensor is a piezoelectric sensor.

10. The system of claim 7, wherein the control system is a full authority engine control system.

11. The system of claim 1, wherein the rotating drive shaft is a high pressure drive shaft coupling a high pressure turbine section to a high pressure compressor section.

12. The system of claim 1, wherein the rotating drive shaft is a low pressure drive shaft coupling a low pressure turbine section to at least one of a low pressure compressor section or a fan section.

13. A method of balancing rotor thrust on a thrust bearing of a turbomachine, wherein the turbomachine defines a centerline extending a length of the turbomachine, the method comprising:
   communicating a vibrational frequency from the thrust bearing to the exterior of the turbomachine using a waveguide sensor coupled to the thrust bearing;
   communicating the vibrational frequency to a control sensor communicatively coupled to a control system;
   determining whether the thrust bearing is in a cross-over condition; and
   changing a force on a rotating drive shaft to remove the thrust bearing out of the cross-over condition.

14. The method of claim 13, wherein the vibrational frequency comprises a ball passing frequency.

15. The method of claim 14, further comprising:
   determining if the ball passing frequency of the thrust bearing is below a first threshold.

16. The method of claim 13, further comprising:
   changing a pressure of a thrust cavity in contact with the rotating drive shaft in response to a cross-over condition of the thrust bearing.

17. The method of claim 13, further comprising:
   communicating a signal from the control system to a valve, wherein the valve is coupled to and receives a pressurized fluid from a compressor section of the turbomachine and selectively transfers the pressurized fluid to a thrust cavity in contact with the rotating drive shaft.

18. The method of claim 17, further comprising:
   changing the pressure of the thrust cavity, wherein the changing pressure of the thrust cavity modifies a force applied to the rotating drive shaft.

19. A method of determining a direction of rotor thrust on a thrust bearing of a turbomachine, wherein the turbomachine defines a centerline extending a length of the turbomachine, the method comprising:
   communicating a ball passing frequency from the thrust bearing to the exterior of the turbomachine using a first waveguide sensor and a second waveguide sensor coupled to the thrust bearing;
   communicating the ball passing frequency to control sensors communicatively coupled to a control system;
   comparing a magnitude of a first ball passing frequency communicated from the first waveguide sensor at a forward end of the thrust bearing relative to the centerline to a second ball passing frequency communicated from the second waveguide sensor at an aft end of the thrust bearing relative to the centerline.

20. The method of claim 19, further comprising:
   determining the direction of the rotor thrust acting on the rotating drive shaft relative to the centerline based on a difference between the magnitude of first ball passing frequency and the second ball passing frequency.

* * * * *